April 26, 1927.                C. H. BRASELTON ET AL                    1,625,788
                                VIBRATION OPERATED PUMP
                                Original Filed Jan. 27, 1922
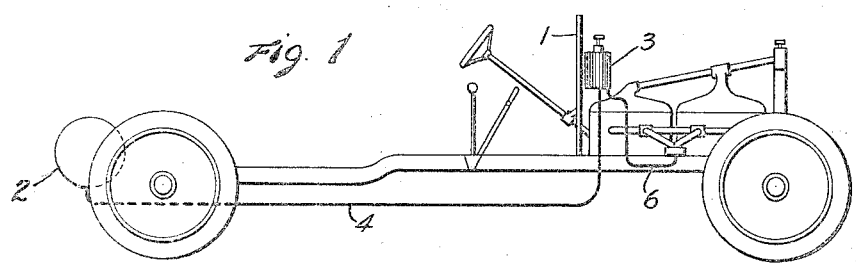
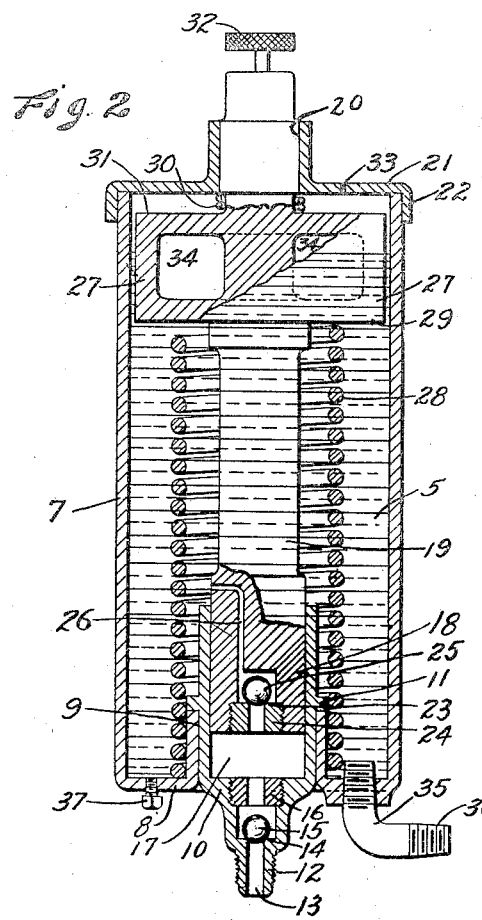

Patented Apr. 26, 1927.

1,625,788

UNITED STATES PATENT OFFICE.

CHESTER H. BRASELTON, OF NEW YORK, AND FRED B. MacLAREN, OF MALBA, NEW YORK; SAID MacLAREN ASSIGNOR TO SAID BRASELTON.

VIBRATION-OPERATED PUMP.

Application filed January 27, 1922, Serial No. 532,193. Renewed August 7, 1924.

This invention relates to a method and mechanism for the utilization of the energy existing in the vibration or movement of vehicles, other mechanisms, bodies or parts, materials or things, for producing work. More particularly it relates to improvements upon the mechanism and method shown in our application filed the 1st day of February, 1922, Serial No. 533,493, entitled, "Vibration operated pumping mechanism" and also upon the mechanism and method shown in our application filed the 23rd day of January, 1922, Serial No. 531,137 entitled "Method and apparatus for pumping fluids", in which an embodiment of the invention was shown in which the energy of a vibrating body, through the medium of a loosely supported inertia element was used for pumping liquid fuel from a lower level to a higher level tank during the vibration or operation of the automobile.

In the form of the invention shown herein the inertia element at one portion is hollowed out or made of lighter material so that the enlarged portion of the same not only operates as a damper to control the pumping as in our other application, but also as the liquid in the receiving tank rises to surround the hollowed portion of the inertia element the inertia element is buoyed up more than in our other case with the effect that the supporting spring will then push the element higher and hold it there more effectively than if the enlarged portion of the inertia element were not lighter as by being hollowed out.

The invention further relates to various details of construction and mounting of the various parts looking toward cheaper cost of production and more efficient operation.

The device here shown is illustrated as applied to an automobile and for utilizing the vibration of the automobile when running to lift liquid fuel from the rear supply tank to an auxiliary supply tank of higher level from which the liquid will flow to the carburetor.

In the drawings,

Figure I represents an automobile with our invention applied thereto.

Figure II is a vertical cross section of the pump tank shown in Figure I.

In the drawings the automobile of Figure I is shown with the usual conventional parts, including the dash 1. The main supply tank of the automobile is shown at the rear and designated as 2. Our pump tank is here shown as mounted on the dash at 3, this being connected to the rear tank by fuel pipe 4. The mechanism of our invention utilizes the vibration of the car for pumping the liquid fuel from the rear tank 2 through pipe 4 to the fuel chamber 5 inside tank 3 from which the fuel flows by gravity to the carburetor through pipe 6 as needed.

In Figure II the numeral 7 designates the casing of tank 3 the sides and bottom of which are formed of pressed metal and integrally. The bottom 8 is furthermore pressed upwardly to form a flange 9 inside the casing 7. Mounted within the opening inside the flange 9 is tube 10 inserted from the top so that its shoulder 11 rests upon the top of the flange 9. This tube 10 is preferably made of one piece and in it at the bottom is formed the pipe connection 12 adapted to be attached with the forward end of pipe 4. This connection 12 has an axial opening 13, a valve seat 14 and a ball valve 15 normally resting on the valve seat and serving to permit flow of gasoline from the rear tank up into the pump tank but to prevent flow in the opposite direction. The valve 15 is held in place by a nut 16 screwed into a counterbored portion in the tube 10 just above the ball 15. This nut 16 is removable for the insertion or removal of the ball 15 or cleaning of the valve seat. The chamber 17 in the inside of tube 10 is a pump chamber and inside the tube 10 and working in this pump chamber is the lower end 18 of an inertia element 19 projecting upwardly in the casing 7 and preferably through an opening 20 in cap 21 properly flanged at 22 to fit over the top of the casing 7. The lower end 18 of the inertia piston has a valve seat 23 on a removable nut 24 screwing into a counterbored and threaded portion of the lower end of the piston. A ball valve 25 cooperates with the valve seat 23 to permit flow of liquid from the pump chamber 17 past the valve and through openings 26 to the outside of the piston and opening into the space above and surrounding the upper end of tube 10. This ball valve, however, serves to prevent flow of the liquid in the opposite direction past it.

Near the upper end of the piston 19 the same is enlarged at 27 to make a snug fit within the interior wall of the casing 7. A spring 28 having its upper end against the lower surface 29 of the enlarged portion 27 of the piston and its lower end working against the bottom of the casing 7, serves to yieldingly support the piston forming the inertia element at a point of balance from which it may move in either direction relatively to the casing 7. A buffer spring 30 is mounted between the upper surface 31 of the enlarged portion 27 of the inertia element and the bottom of upper cap 21. The inertia element projecting through the cap 21 is formed with a handle 32 by which the inertia piston may be operated up and down manually, if desired. A small opening 33 is provided in the cap 21 to keep the inside of the tank under atmospheric pressure.

The part 27 of the piston may be hollowed as at 34 to reduce its mass at this point and to make this portion of the piston more buoyant, or this part of the piston may be made of lighter material than the other part to accomplish the same purpose as will afterwards appear.

A coupling 35 screws into the lower end of the casing and has its end project upwardly beyond the bottom of the inside of the casing in order that a space of lower level than the upper end of this joint may be allowed for the collection of sediment rather than to allow the sediment to freely flow from the chamber 5 through this joint which connects at 36 with pipe 6 leading to the carburetor. A screw plug 37 removably screws in another opening in the bottom of tank 7 by means of which sediment or liquid may be drained out from the extreme bottom of the tank.

The joints between the tube 10 and flange 9 are soldered or otherwise made liquid and gas tight and it is preferred that the cap 21 be fastened tightly on the top of casing 7 in any convenient manner.

In the operation any vibration of the automobile due to its traveling over the road or the vibration caused by the operation of the engine or any other shaking of the automobile or the pump tank 7, will, due to the inertia of the piston 19 which is loosely mounted in the pump tank on the spring 28, cause relative upward and downward movement between the piston 19 and the tube cylinder 10. This oscillation between the piston and its cylinder and with the cooperation of the valves above described, serves to pump liquid from the rear tank 2 through pipe 4 into pump space 17 and from there pass the upper valve through opening 26 into the space 5 from which it may flow to the carburetor when needed. As the level in the space 5 increases and reaches the surface 29 from the bottom of the enlarged part 27 of the inertia element this surface tends to dampen the vibration of the inertia element and to stop the same and further pumping. By making this part of the piston more buoyant than the other part, as by hollowing it out or by making it of lighter material, the increased buoyancy of this part of the inertia element as the liquid rises around it also tends to increase the dampening effect by allowing the spring to be aided by the buoyancy of this part of the inertia element now in the liquid so that the spring will then be more effective in supporting the inertia element and will then hold the same in its uppermost position and further reduce the vibration.

The effect of this construction and design is to very efficiently control and prevent any further substantial oscillation of the piston and further pumping of liquid from the rear tank to the chamber 5 until the liquid flows from this chamber to the carburetor and the upper level of the liquid 5 drops to reduce the buoyancy and the dampening effect after which pumping will again be resumed to raise the level of the liquid.

Having described our invention, what we claim is:

1. The combination of a hollow tank adapted to be subjected to vibration; a tank of lower level; a pump chamber within the hollow tank; a relatively heavy piston working in the pump chamber and projecting upwardly therefrom; means for supporting the piston upwardly in a yielding manner against gravity so that when the hollow tank is vibrated vertically the inertia of the piston will cause relative movement between it and the tank; and an enlarged portion on the piston above the pump chamber and working in the liquid containing portion of the hollow tank and adapted to dampen the operation of the piston when the liquid rises to the surface of the enlarged portion of the piston, said enlarged portion being lighter in mass per unit volume than the other parts of the piston whereby the buoyancy of said portion when submerged in the liquid tends to relieve the weight of the piston on the spring so that the latter will push the piston upwardly to elevated position to its uppermost limit and thereby reduce the vibration of the piston when said hollow tank has an abnormally high level of liquid therein.

2. The combination of a hollow pump tank adapted to be vibrated to operate the pump contained therein; a yieldingly mounted piston and cooperating cylinder in the tank forming the pump mechanism; a supply receptacle from which the liquid may be drawn by the pump into the hollow pump tank; means for vibrating the hollow tank to operate the pump mechanism; and a member on the piston above the pump cylinder projecting into the liquid containing portion of the hollow tank, more buoyant than the piston so that when said member is being submerged by the liquid in the tank the point of balance of the piston on its spring will be elevated to bring the member into contact with the top of the cap to reduce the vibration of the piston until the level of the liquid again lowers; and means for feeding the liquid as needed from the pump tank to its consuming means.

3. In a pump mechanism of the class described a hollow cylinder adapted to be vibrated and embodying a liquid receiving chamber for the pump; a piston in the hollow cylinder loosely fitted therein; a relatively buoyant element connected to the piston; valve mechanism whereby liquid may be pumped from a supply chamber into the hollow tank when the hollow cylinder is vibrated; the buoyancy of said element tending to reduce the relative vibration of the piston with respect to the cylinder as the liquid in the receiving space in the pump tank approaches the normally desired maximum height of the liquid desired in said tank.

4. In a pump mechanism of the class described the combination of a vibrating cylinder and tank surrounding the same; a piston loosely mounted in the cylinder and supported by a spring normally at a point of balance; means on the tank for limiting the upward movement of the piston relative to the tank beyond the point of balance; and means whereby the point of balance of the piston is controlled by the level of liquid in the tank so that the spring when the tank is at its normal maximum height of liquid will hold the piston in sufficiently elevated position against the limiting means to prevent further vibration of the piston until the liquid in the tank is lowered.

5. In a mechanism of the class described, the combination of a cylinder adapted to be vibrated; a losely mounted piston in the cylinder projecting from one end thereof and adapted to be operated by the vibration of said cylinder; a liquid receiving tank surrounding said cylinder; an inlet pipe in said cylinder; a check valve in said inlet pipe; a check valve in said piston; an outlet duct in said piston leading from said valve to the periphery of said piston above the top of said cylinder; and means connected to said piston to raise said piston to its upper limit of vibration and stop the operation thereof when the liquid in said receiving tank rises above a predetermined level.

6. In a pumping mechanism the combination of a casing; a pump cylinder within said casing fixed to the base thereof; a piston movable within said cylinder; resilient mechanism supporting said piston; and a weighted member fixed to the piston, said weighted member having an average density less than that of the piston and adapted to lift the piston to stop the operation thereof when the liquid rises beyond a predetermined level in the casing.

7. In a liquid pump mechanism the combination of a casing; a pump cylinder withing the casing; inlet and outlet ports connected to said cylinder; a piston movable within said cylinder; a weighted member connected to the piston; and resilient means tending to maintain said piston at a point of balance relative to the cylinder, said weighted member having an average density less than that of the piston and adapted to lift the piston to stop the operation thereof when the liquid rises beyond a predetermined level in the casing.

In testimony whereof, we affix our signatures.

CHESTER H. BRASELTON.
FRED B. MacLAREN.